United States Patent [19]

Deguchi

[11] Patent Number: 5,231,647
[45] Date of Patent: Jul. 27, 1993

[54] MODEM COMPRISING SAW FILTERS HAVING OPPOSITE BASSBAND DELAY CHARACTERISTICS

[75] Inventor: Takumi Deguchi, Tokyo, Japan
[73] Assignee: NEC Corporation, Japan
[21] Appl. No.: 661,507
[22] Filed: Feb. 26, 1991
[30] Foreign Application Priority Data
Feb. 27, 1990 [JP] Japan .................................... 2-47659
[51] Int. Cl.⁵ .............................................. H04B 1/38
[52] U.S. Cl. .......................................... 375/8; 375/96; 375/39
[58] Field of Search ................ 375/7, 8, 39, 103, 102, 375/96; 329/304; 332/103

[56] References Cited
U.S. PATENT DOCUMENTS

| | | | |
|---|---|---|---|
| 4,751,478 | 6/1988 | Yoshida | 375/39 |
| 4,881,049 | 11/1989 | Yagi | 375/39 |
| 4,890,316 | 12/1989 | Walsh et al. | 375/8 |
| 5,048,054 | 9/1991 | Eyuboglu et al. | 375/8 |
| 5,057,786 | 10/1991 | Yoshikawa | 375/39 |

Primary Examiner—Stephen Chin
Attorney, Agent, or Firm—Ostrolenk, Faber, Gerb & Soffen

[57] ABSTRACT

In a modem device comprising (a) a first surface acoustic wave (SAW) rolloff filter circuit (51) having a first passband delay characteristic for primarily band-limiting into an output signal of a modulator device a multi-valued quadrature amplitude modulated signal derived from input digital signal sequences and (b) a second surface acoustic wave rolloff filter circuit (52) having a second passband delay characteristic for rolloff waveform shaping an input signal of a demodulator device into a rolloff waveform shaped signal which is used in producing output digital signal sequences of the demodulator device, the second passband delay characteristic is selected as an inverse characteristic of the first passband delay characteristic. The first and the second passband delay characteristics have first and second ripple amplitudes. Preferably, the first and the second ripple amplitudes are given opposite polarities. More preferably, the second ripple amplitude is substantially equal to the first ripple amplitude. It is possible to use the first and the second surface acoustic wave rolloff filter circuits either separately in the modulator and the demodulator devices, or in between the modulator and the demodulator devices, or only in the modulator or the demodulator device.

12 Claims, 6 Drawing Sheets

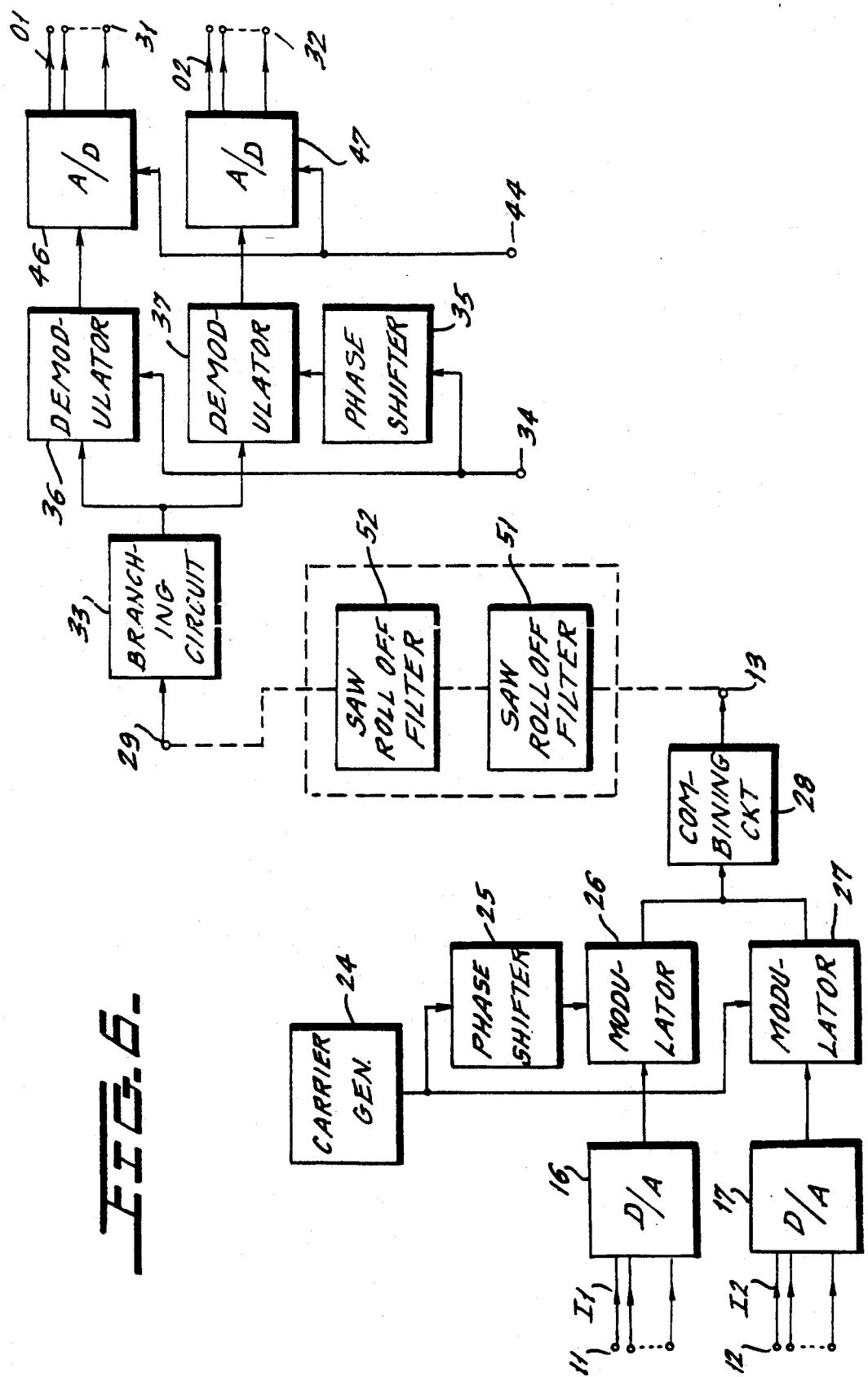

MODEM COMPRISING SAW FILTERS HAVING OPPOSITE BASSBAND DELAY CHARACTERISTICS

BACKGROUND OF THE INVENTION

This invention relates to a modem device for use in a multivalued quadrature amplitude modulated signal communication network in carrying out modulation and demodulation between a multivalued quadrature amplitude modulated signal and input and output digital signal sequences. This invention relates furthermore to a pair of surface acoustic wave (SAW) filter circuits for use in the multivalued quadrature amplitude modulated signal communication network.

In the manner which will later be described in detail, a modem device comprises a modulator device and a demodulator device. A multivalued quadrature amplitude modulated signal communication network comprises such a modem device as a first modem device and a counterpart modem device which may be called a second modem device.

According to prior art, the modulator device of each modem device comprises a digital-to-analog converter circuit for converting a plurality of input digital signal sequences to a plurality of multivalued baseband signal sequences, respectively. After band-limited, the baseband signal sequences are used in quadrature amplitude modulating a modulator carrier signal into a plurality of amplitude modulated signal sequences, respectively. A combining circuit is used in combining the amplitude modulated signal sequences into a multivalued quadrature amplitude modulated signal.

Such multivalued quadrature amplitude modulated signals are produced by the first and the second modem devices as first and second modulator output signals. It is unnecessary that the modulator device of the first modem device should deal with the input digital signal sequences of a number which is equal to the number of input digital signal sequences used in the modulator device of the second modem device. In any event, the first modem device receives the second modulator output signal from the second modem device as a first demodulator input signal. The second modem device receives the first modulator output signal as a second demodulator input signal.

In each demodulator device, such a demodulator input signal is branched by a branching circuit into a plurality of branched signal sequences. In a conventional demodulator device, the branched signal sequences are rolloff waveform shaped into a plurality of rolloff waveform shaped signal sequences, respectively. A quadrature amplitude demodulator circuit is used in quadrature amplitude demodulating the rolloff waveform shaped signal sequences into a plurality of demodulated signal sequences, respectively. The demodulated signal sequences are converted by an analog-to-digital converter circuit to a plurality of output digital signal sequences, respectively. The demodulated signal sequences are reproductions of the respective multivalued baseband signal sequences used in the counterpart modem device which produces the demodulator input signal under consideration. The output digital signal sequences are reproductions of the respective input signal sequences used in the counterpart modem device in question.

For band limitation, a first low-pass rolloff filter has been used in the modulator device of each modem device. In the demodulator device of each modem device, rolloff waveform shaping has been carried out by a second low-pass rolloff filter in cooperation with the first low-pass rolloff filter used in the modulator device of the counterpart modem device.

The multivalued quadrature amplitude modulated signal communication network must have an excellent transmission characteristic. Each demodulator device must produce the output digital signal sequences with a low bit error rate. In order to achieve the excellent transmission characteristic and, in particular, to reduce intersymbol interference and thereby to attain a least possible bit error rate, the rolloff filters must have strictly limited passband distortion and delay distortion. More specifically, the rolloff filters must have passband amplitude and delay characteristics of least possible deviations and have a steep out-of-band attenuation characteristic.

Such stringent filter characteristics have recently become more stringent in order to deal with a highly multivalued quadrature amplitude modulated signal and to cope with a lower rolloff rate. The low-pass rolloff filters must therefore be higher-order filters, each of which comprises many capacitors and coils and is bulky and expensive.

In view of the above, a surface acoustic wave filter has recently been used as a rolloff filter. Inasmuch as the surface acoustic wave filter is used in general as a bandpass filter, it is possible to rolloff waveform shape a filter input signal in a carrier frequency band. The surface acoustic wave rolloff filters of a half in number are therefore sufficient in each modem device as compared with the low-pass rolloff filters. Moreover, each surface acoustic wave rolloff filter is compact when compared with each low-pass rolloff filter. This makes it possible to provide a compact modem device.

A conventional surface acoustic wave rolloff filter has, however, a passband delay characteristic which has ripple components. The bit error rate is deteriorated by the ripple components. Low-pass rolloff filters are therefore used even in a recent modem device, particularly when the modem device is used in dealing with a highly multivalued signal of, for example, two hundred and fifty-six values.

SUMMARY OF THE INVENTION

It is therefore an object of the present invention to provide a modem device for use in a multivalued quadrature amplitude modulated signal communication network, which device is compact and inexpensive and can carry out modulation and demodulation between a multivalued quadrature amplitude modulated signal and input and output digital signal sequences with an excellent transmission characteristic.

It is another object of this invention to provide a modem device of the type described, which comprises rolloff filters of a low overall rolloff rate.

It is still another object of this invention to provide a modem device of the type described, which can demodulate the modulated signal into the output digital signal sequences with an excellently low bit error rate.

It is a further object of this invention to provide a combination of two surface acoustic wave rolloff filter circuits for use between a modulator device and a demodulator device of a multivalued quadrature amplitude modulated signal communication network, which combination is for giving an excellent transmission characteristic to the network.

It is a still further object of this invention to provide a combination of the type described, which has a low overall rolloff rate.

It is a yet further object of this invention to provide a combination of the type described, which can make the demodulator device demodulate a multivalued quadrature amplitude modulated signal into output digital signal sequences with an excellently low bit error rate.

On describing the gist of an aspect of this invention, it is possible to understand that a modem device comprises a modulator device and a demodulator device, that the modulator device comprises a digital-to-analog converter circuit for converting a predetermined number of input digital signal sequences into a plurality of multivalued baseband signal sequences, respectively, a modulator circuit for quadrature amplitude modulating a modulator carrier signal by the baseband signal sequences into a plurality of amplitude modulated signal sequences, respectively, a combining circuit for combining the amplitude modulated signal sequences into a quadrature amplitude modulated signal, and a first surface acoustic wave rolloff filter circuit having a first passband delay characteristic for band-limiting the quadrature amplitude modulated signal into a modulator output signal, and that the demodulator device comprises a second surface acoustic wave rolloff filter circuit having a second passband delay characteristic for rolloff waveform shaping a demodulator input signal into a rolloff waveform shaped signal, a branching circuit for branching the rolloff waveform shaped signal into a predetermined number of branched signal sequences, a demodulator circuit for quadrature amplitude demodulating the branched signal sequences into a plurality of demodulated signal sequences, respectively, and an analog-to-digital converter circuit for converting the demodulated signal sequences into a plurality of output digital signal sequences, respectively.

According to the above-described aspect of this invention, the above-understood modem device is characterised in that the second passband delay characteristic is an inverse characteristic of the first passband delay characteristic.

On describing the gist of a different aspect of this invention, it is possible to understand that a modem device comprises a modulator device and a demodulator device, that the modulator device comprises a digital-to-analog converter circuit for converting a predetermined number of input digital signal sequences into a plurality of multivalued baseband signal sequences, respectively, a modulator circuit for quadrature amplitude modulating a modulator carrier signal by the baseband signal sequences into a plurality of amplitude modulated signal sequences, respectively, a combining circuit for combining the amplitude modulated signal sequences into a quadrature amplitude modulated signal, a first surface acoustic wave rolloff filter having a first passband delay characteristic for band-limiting the quadrature amplitude modulated signal into a filter output signal, and a second surface acoustic wave rolloff filter having a second passband delay characteristic for rolloff waveform shaping the filter output signal into a modulator output signal, and that the demodulator device comprises a branching circuit for branching a demodulator input signal into a predetermined number of branched signal sequences, a demodulator circuit for quadrature amplitude demodulating the branched signal sequences into a plurality of demodulated signal sequences, respectively, and an analog-to-digital converter circuit for converting the demodulated signal sequences into a plurality of output digital signal sequences, respectively.

According to the different aspect of this invention, the above-understood modem device is characterised in that the second passband delay characteristic is an inverse characteristic of the first passband delay characteristic.

On describing the gist of a further different aspect of this invention, it is possible to understand that a combination of first and second surface acoustic wave rolloff filter circuits, which have first and second passband delay characteristics, is for use between a modulator device and a demodulator device, that the modulator device comprises a digital-to-analog converter circuit for converting a predetermined number of input digital signal sequences into a plurality of multivalued baseband signal sequences, respectively, a modulator circuit for quadrature amplitude modulating a modulator carrier signal by the baseband signal sequences into a plurality of amplitude modulated signal sequences, respectively, and a combining circuit for combining the amplitude modulated signal sequences into a quadrature amplitude modulated signal, that the demodulator device comprises a branching circuit for branching a branching circuit input signal into a plurality of branched signal sequences, a demodulator circuit for quadrature amplitude demodulating the branched signal sequences into a plurality of demodulated signal sequences, respectively, and an analog-to-digital converter circuit for converting the demodulated signal sequences into a plurality of output digital signal sequences, respectively, that the first surface acoustic wave rolloff filter circuit is for band-limiting into a filter output signal the quadrature amplitude modulated signal supplied from the combining circuit, and that the second surface acoustic wave rolloff filter circuit is for rolloff waveform shaping the filter output signal into a rolloff waveform shaped signal for supply to the branching circuit as the branching circuit input signal.

According to the further different aspect of this invention, the above-understood combination is characterised in that the second passband delay characteristic is an inverse characteristic of the first passband delay characteristic.

BRIEF DESCRIPTION OF THE DRAWING

FIG. 6 is a block diagram of a modulator device and a demodulator device according to a fourth embodiment of this invention.

Figure 1:
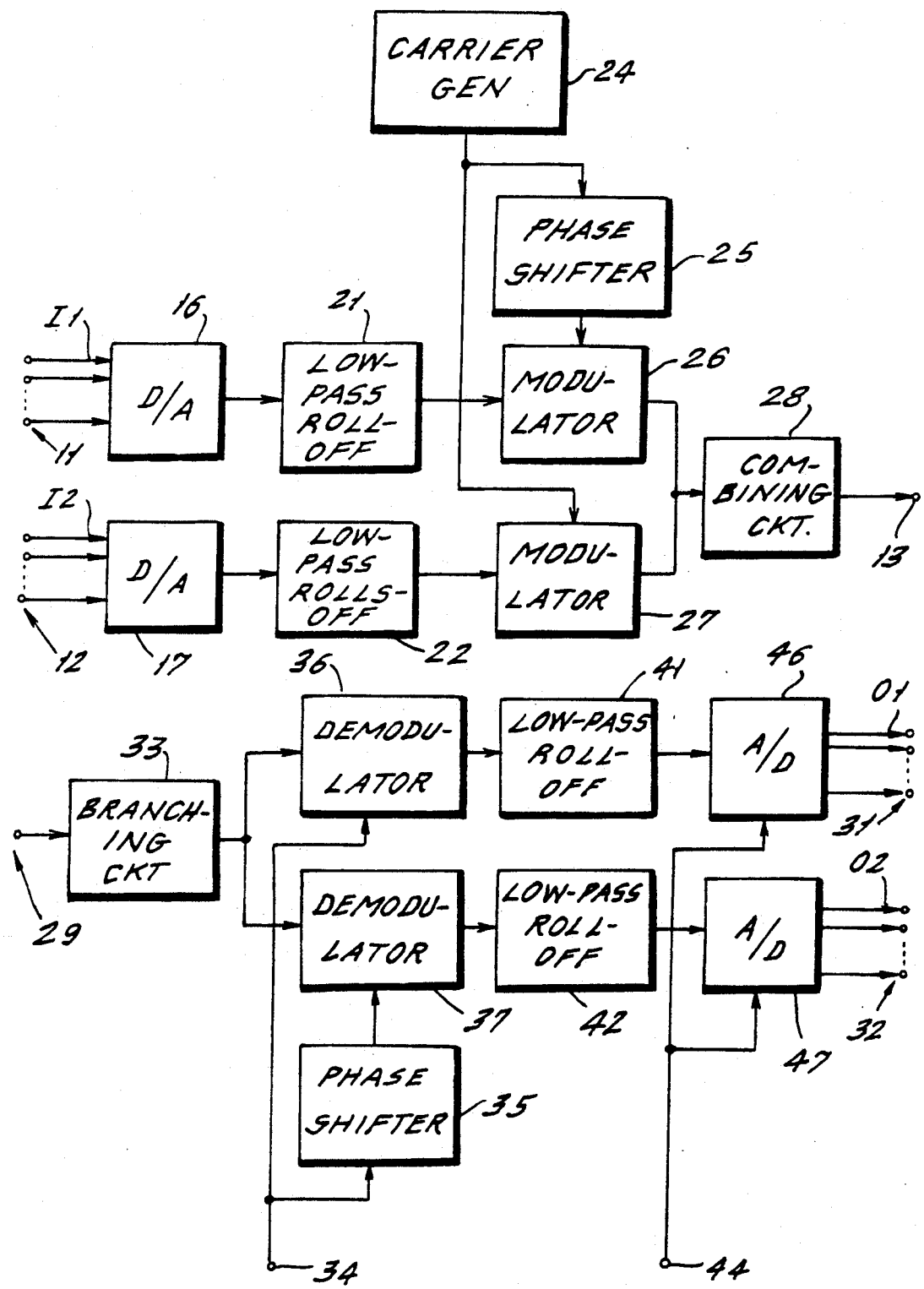
FIG. 1 is a block diagram of a conventional modem device.

DESCRIPTION OF THE PREFERRED EMBODIMENTS:

Referring to FIG. 1, a conventional modem device will first be described in order to facilitate an understanding of the present invention. The modem device comprises a modulator device illustrated in an upper part of the figure and a demodulator device depicted in a lower half.

In the example being illustrated, the modulator device has a first set of modulator input terminals which are collectively indicated at 11. A second set of modulator input terminals are collectively depicted at 12. First and second input digital signal sequences I1 and I2 are supplied to the first and the second sets of modulator input terminals 11 and 12. The modulator device has a modulator output terminal 13. It will be assumed that each of the first and the second input digital signal sequences I1 and I2 is an n-bit digital signal sequence, where n represents a predetermined integer.

The modulator device comprises first and second digital-to-analog converters (D/A) 16 and 17 which are herein referred to collectively as a digital-to-analog converter circuit and are for converting the first and the second input digital signal sequences to first and second multivalued baseband signal sequences. Each of the first and the second multivalued baseband signal sequences is a $2^n$-valued baseband signal sequence having $2^n$ values. In the manner known in the art, the converters 16 and 17 are supplied in common with a modulator clock signal through a connection (not shown).

First and second low-pass rolloff filters 21 and 22 are for band-limiting and rolloff waveform shaping the first and the second multivalued baseband signal sequences into first and second filter output signals. A carrier generator 24 is for generating a modulator carrier signal of a carrier frequency. A modulator phase shifter 25 is for giving a phase shift of 90° to the modulator carrier signal to produce a quadrature-phase carrier signal.

A first modulator 26 is for amplitude modulating the modulator carrier signal by the first filter output signal into a first amplitude modulated signal sequence. A second modulator 27 is for amplitude modulating the quadrature-phase carrier signal by the second filter output signal into a second amplitude modulated signal sequence. A combination of the modulator phase shifter 25 and the first and the second modulators 26 and 27 is herein called a modulator circuit. It is therefore possible to understand that the modulator circuit is for quadrature amplitude modulating the modulator carrier signal by the first and the second multivalued baseband signal sequences into the first and the second amplitude modulated signal sequences because the first and the second filter output signals are band-limited and rolloff waveform shaped first and second multivalued baseband signal sequences.

A combining circuit 28 is for combining the first and the second amplitude modulated signal sequences into a multivalued quadrature amplitude modulated signal. As a modulator output signal, the quadrature amplitude modulated signal is delivered through the modulator output terminal 13 towards a demodulator device of a counterpart modem device. The demodulator device of the counterpart modem device will later be illustrated.

It may be mentioned here that the illustrated modem device is for use together with the counterpart modem device in a multivalued quadrature amplitude modulated signal communication network and may be called a first modem device. In this event, the counterpart modem device can be called a second modem device. Alternatively, the counterpart and the illustrated modem devices can be referred to as the first and the second modem devices.

In addition to the demodulator device, the counterpart modem device comprises a modulator device which is similar in structure and in operation to the illustrated modulator device. The modulator devices of the first and the second modem devices are for producing first and second quadrature amplitude modulated signals towards the demodulator devices of the second and the first modem devices, respectively. The modulator device of the counterpart modem device may, however, deal with a different number of input digital signal sequences.

In FIG. 1, the demodulator device has a demodulator input terminal 29 and first and second sets of demodulator output terminals. The demodulator output terminals of the first set are collectively illustrated at 31. The second set is depicted at 32. The demodulator input terminal 29 is for receiving the modulator output signal sent from the modulator device of the counterpart modem device.

The demodulator device comprises a branching circuit 33 for bifurcating the demodulator input signal into first and second branched signal sequences. A demodulator carrier signal is regenerated in the known manner from the demodulator input signal and supplied to a carrier signal input terminal 34. A demodulator phase shifter 35 is for giving a phase shift of 90° to the demodulator carrier signal to produce a phase shifted carrier signal.

A first demodulator 36 is for using the demodulator carrier signal in demodulating the first branched signal sequence into a first demodulated signal sequence. By using the phase shifted carrier signal, a second demodulator 37 demodulates the second branched signal sequence into a second demodulated signal sequence. A combination of the demodulator phase shifter 35 and the first and the second demodulators 36 and 37 is herein called a demodulator circuit. The first and the second branched signal sequences are quadrature amplitude demodulated by the demodulator circuit 35-37 into the first and the second demodulated signal sequences. The demodulated signal sequences are multivalued baseband signal sequences which are reproductions of the first and the second multivalued baseband signal sequences used in the modulator device of the counterpart modem device.

The first and the second demodulated signal sequences are rolloff waveform shaped by first and second low-pass rolloff filters 41 and 42 into first and second rolloff waveform shaped signals. In the manner known in the art, an overall rolloff waveform shaping characteristic is had in general separately in the modulator and the demodulator devices. A complete rolloff waveform shaping characteristic is therefore had at output sides of the first and the second low-pass rolloff filters 41 and 42. This makes the first and the second rolloff waveform shaped signals have substantially no intersymbol interference.

A demodulator clock signal is regenerated from the demodulator input signal and supplied to a clock signal input terminal 44. Timed by the demodulator clock signal, first and second analog-to-digital converters (A/D) 46 and 47 are for converting the first and the second rolloff waveform shaped signals into first and second output digital signal sequences 01 and 02 for supply to the first and the second sets of demodulator output terminals 31 and 32. The output digital signal sequences 01 and 02 are reproductions of the input digital signal sequences, such as I1 and I2, used in the modulator device of the counterpart modem device and have an excellently low bit error rate. The first and the second analog-to-digital converters 46 and 47 are herein referred to collectively as an analog-to-digital converter circuit for converting the first and the second rolloff waveform shaped signals into the first and the second output digital signal sequences 01 and 02.

It should be noted in connection with the above that the low-pass rolloff filters 21, 22, 41, and 42 are undesiredly bulky and expensive in order to achieve a low rolloff rate and the low bit error rate. On the other hand, a surface acoustic wave (SAW) filter has recently been popular and is used in general as a band-pass filter in the carrier frequency. An example is disclosed in U.S. Pat. No. 4,910,426 issued to Takaya Watanabe and another and assigned to the present assignee. It is possible to use such a surface acoustic wave filter as a compact rolloff filter in place of a pair of low-pass rolloff filters, such as 21 and 22 or 41 and 42. It has, however, been confirmed by the instant inventor that a conventional surface acoustic wave rolloff filter has a passband delay characteristic which has ripple components and unavoidably deteriorates the bit error rate. In fact, the low-pass rolloff filters, such as 21, 22, 41, and 42, have been used in a recent modem device, particularly when the modem device is used in dealing with a highly multivalued quadrature amplitude modulated signal.

Figure 2:
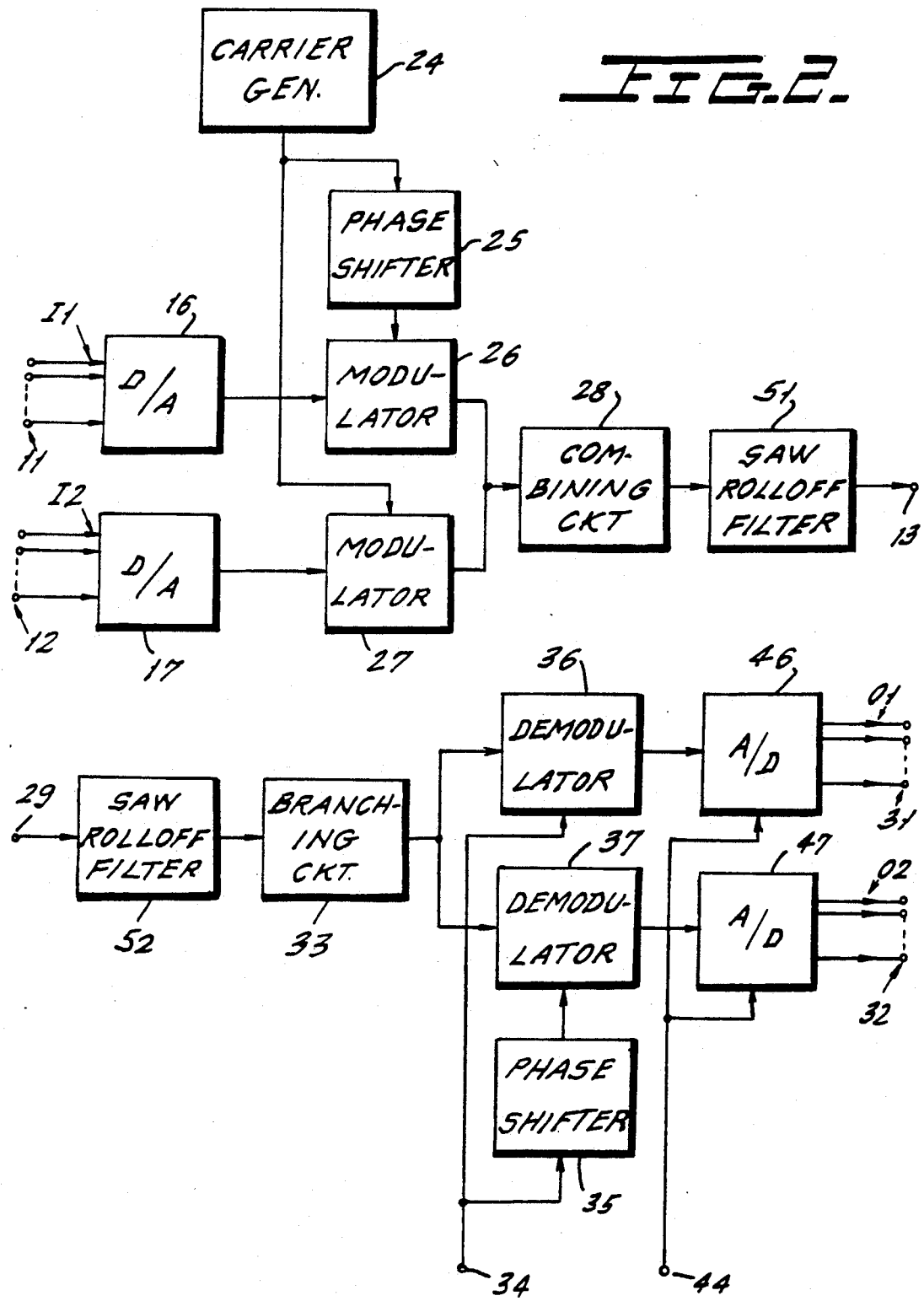
FIG. 2 is a block diagram of a modem device according to a first embodiment of the instant invention.

Referring now to FIG. 2, the description will proceed to a modem device according to a first embodiment of the present invention. The modem device comprises similar parts which are designated by like reference numerals and are similarly operable with likewise named signals.

It should, however, be noted in connection with the modulator device illustrated in FIG. 2 that the modulator circuit 25-27 is for quadrature amplitude modulating the modulator carrier signal directly by the first and the second multivalued baseband signal sequences into the modulated signal sequences, which are combined into the quadrature amplitude modulated signal. A first surface acoustic wave rolloff filter 51 has a first passband delay characteristic for primarily band-limiting the amplitude modulated signal into a filter output signal or a quadrature amplitude modulated and band-limited signal, which is supplied to the modulator output terminal 13 as the modulator output signal.

In the demodulator device depicted in FIG. 2, the demodulator input signal is not supplied directly to the branching circuit 33. Instead, the demodulator input signal is supplied to a second surface acoustic wave rolloff filter 52 which has a second passband delay characteristic and is for primarily rolloff waveform shaping the demodulator input signal into a rolloff waveform shaped signal for supply to the branching circuit 33. The rolloff waveform shaped signal is therefore bifurcated by the branching circuit 33 into the first and the second branched signal sequences.

In the above description, the first and the second surface acoustic wave rolloff filters 51 and 52 have an overall rolloff waveform shaping characteristic which completely rolloff waveform shapes the rolloff waveform shaped signal like a combination of the low-pass rolloff filters 21, 22, 41, and 42 described in conjunction with FIG. 1. In addition, the modem device is similar in structure to a conventional one insofar as described above and when operation is taken away from consideration. It should, however, clearly be noted in this connection that the second passband delay characteristic is an inverse characteristic of the first passband delay characteristic.

Figure 3:
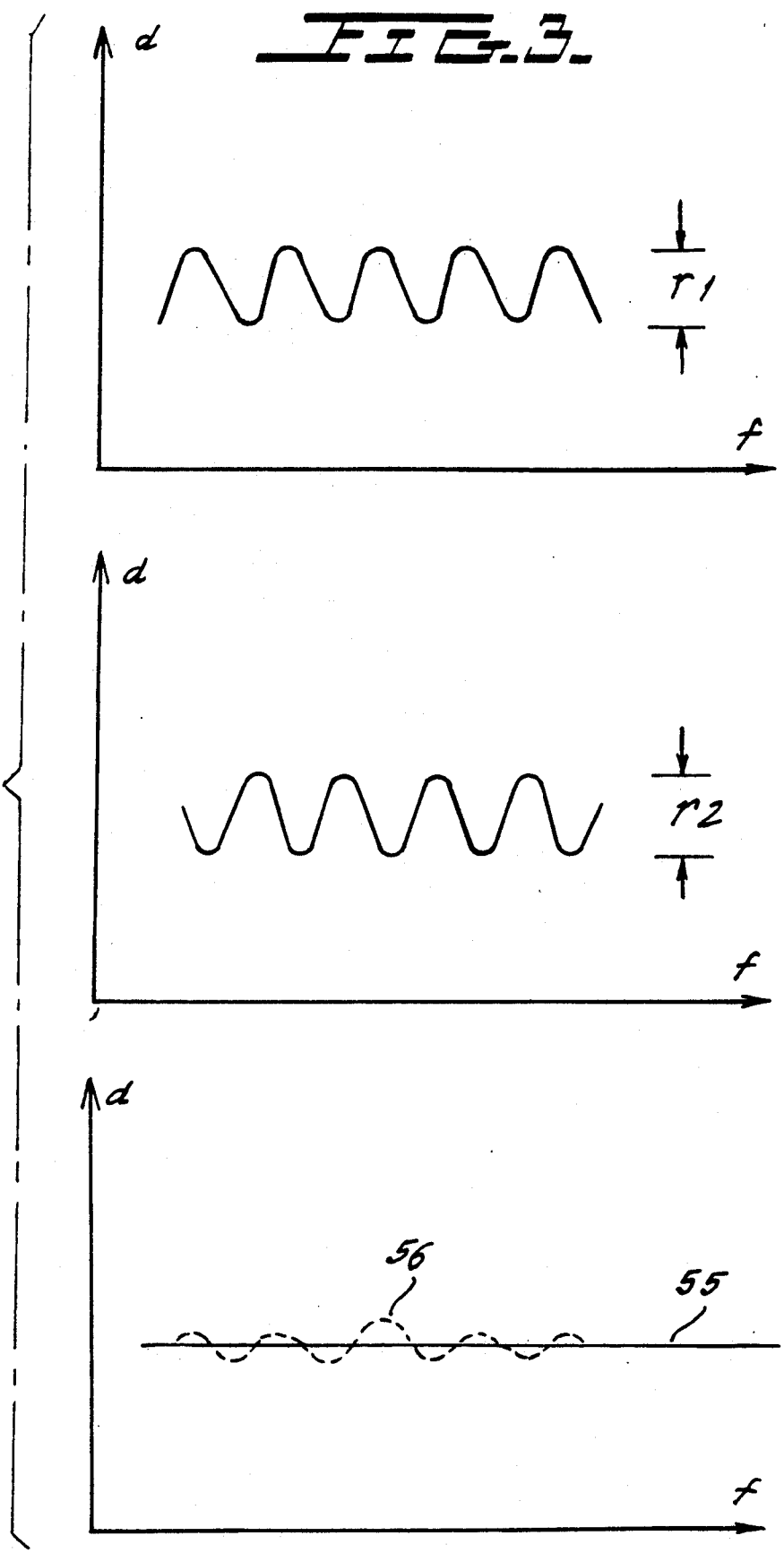
FIG. 3 schematically shows passband delay characteristics of rolloff filter circuits which are used in the modem device illustrated in FIG. 2.

Referring to FIG. 3, the first passband delay characteristic of the first surface acoustic wave rolloff filter 51 (FIG. 2) is schematically exemplified along a first or top line. The second passband delay characteristic is likewise illustrated along a second or middle line. The first and the second passband delay characteristic result in an overall delay characteristic similarly depicted along a third or bottom line in FIG. 3.

In FIG. 3, the delay characteristic is depicted along each of the first through the third lines with an amount d of delay illustrated versus frequency f. The first passband delay characteristic should be a filter characteristic which must be satisfactory for use in a modulator device. The second passband delay characteristic should have an amplitude characteristic which is necessary for use in a demodulator device. The overall delay characteristic must be capable of producing a sufficiently rolloff waveform shaped signal. It has been confirmed by the present inventor that the second passband delay characteristic should be an inverse characteristic of the first passband delay characteristic, namely, a polarity inversed passband delay characteristic relative to the first passband delay characteristic.

In the manner illustrated along the first and the second lines, the delay characteristic of a surface acoustic wave filter has ripple components having ripple amplitudes, which may collectively be called a ripple amplitude. The first and the second passband delay characteristics therefore have first and second ripple amplitudes r1 and r2. The inverse characteristic is realized by giving opposite polarities to the first and the second ripple amplitudes r1 and r2.

Preferably, the first and the second ripple amplitudes should be equal to each other. In this event, the overall delay characteristic becomes independent of the frequency in the manner illustrated by a solid line 55 along the third line. Even when the first and the second ripple amplitudes are unequal, the overall delay characteristic becomes as shown by a dashed-line curve 56 along the third line and is very useful in carrying out band limitation and rolloff waveform shaping with an excellently reduced bit error rate as compared with a case where the first and the second ripple amplitudes have a common polarity.

In connection with the above, it may be mentioned here that a surface acoustic wave filter may comprise two transducers. One of the transducers is typically an apodized electrode member. The other may be usual or normal electrode member. The passband delay characteristic is mainly determined by the apodized electrode member. The amplitude characteristic mainly depends on the usual electrode member. It has been confirmed by the instant inventor that the delay characteristic can be adjusted with substantially no influence on the amplitude characteristic by changing the number of taps of the apodized electrode pairs. The ripple amplitudes can therefore be given the opposite polarities and an approximately common value either experimentally or by computer simulation. Preferably, the first and the second surface wave rolloff filters 51 and 52 (FIG. 2) are two of the surface acoustic wave filters which are manufactured and sold.

Figure 4:
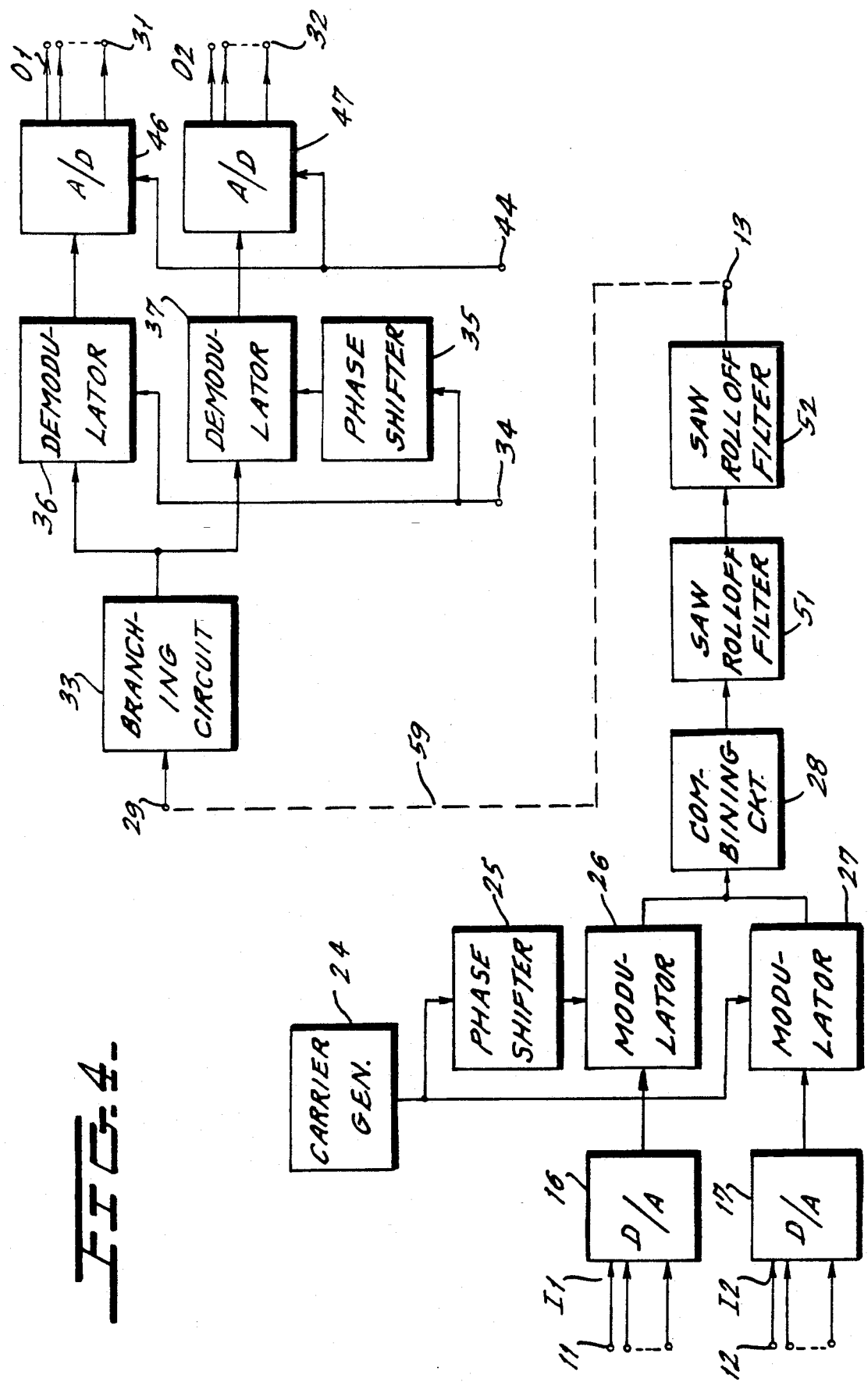
FIG. 4 is a block diagram of a modulator device and a demodulator device according to a second embodiment of this invention.

Referring now to FIG. 4, attention will be directed to a modulator device and a demodulator device according to a second embodiment of this invention. Similar parts are again designated by like reference numerals and are similarly operable with likewise named signals.

In contrast to the modem device illustrated with reference to FIG. 2, the modulator device is in the first modem device and the demodulator device, in the second modem device. From the first modem device, the modulator output signal is delivered to the second modem device through a communication line 59 which may be either a radio communication channel or a wired communication channel. The first and the second surface acoustic wave rolloff filters 51 and 52 are connected in series between the combining circuit 28 and the modulator output terminal 13.

Supplied with the multivalued quadrature amplitude modulated signal from the combining circuit 26, the first surface acoustic wave rolloff filter 51 produces a filter output signal. Supplied with the filter output signal, the second surface acoustic wave rolloff filter 52 supplies the rolloff waveform shaped signal to the modulator output terminal 13 as the modulator output signal. It should be noted in connection with the modulator device and the demodulator device being illustrated that the input digital signal sequences are equal in number to the output digital signal sequences. The rolloff waveform shaped signal is branched or divided into the branched signal sequences, which may or may not be equal in number to the predetermined number.

Figure 5:
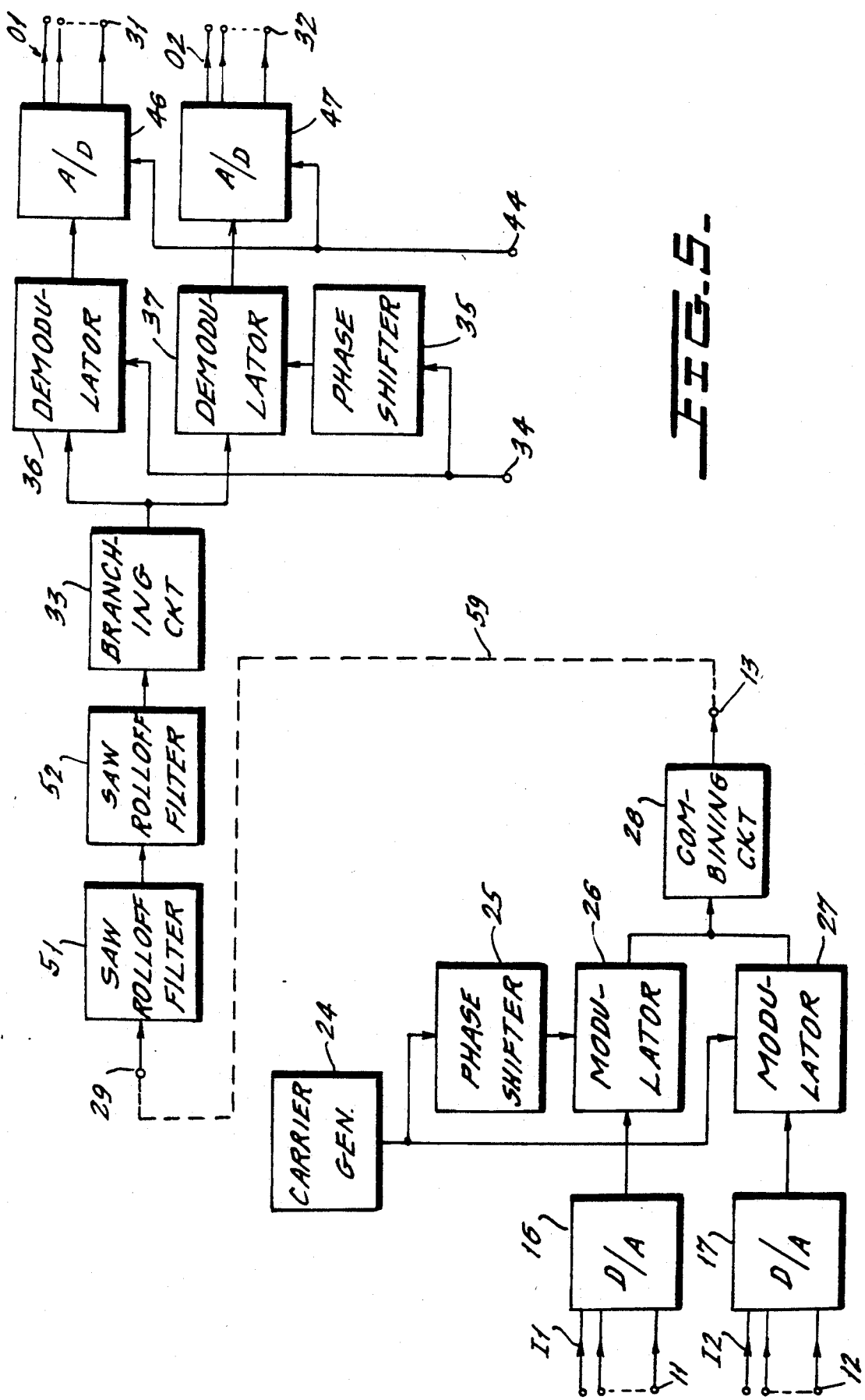
FIG. 5 is a block diagram of a modulator device and a demodulator device according to a third embodiment of this invention.

Generally speaking, the configuration of FIG. 2 is preferred when the communication line 59 is a radio communication channel, particularly a digital microwave communication channel. When the communication line 59 is a wired communication channel, such as in cable transmission, it is possible to use the first and the second surface acoustic wave rolloff filters 51 and 52 between the demodulator input terminal 29 and the branching circuit as shown in FIG. 5. Similarly, it is possible to use the first and the second surface acoustic wave rolloff filters 51 and 52 between the modulator device and the demodulator device as shown in FIG. 6. It is therefore possible to say that this invention provides a combination of the first and the second surface acoustic wave rolloff filters 51 and 52 which are for use between a modulator device and a demodulator device, namely, either separately in the modulator and the demodulator devices or only in the modulator or the demodulator device.

Reviewing FIGS. 2 and 4, it may be noted here that each of the first and the second surface acoustic wave rolloff filters 51 and 52 can be divided into at least two surface acoustic wave rolloff filters. In this event, the at least two surface acoustic wave rolloff filters are herein referred to collectively as a surface acoustic wave rolloff filter circuit. A single surface acoustic wave rolloff filter 51 or 52 can also be called a surface acoustic wave rolloff filter circuit 51 or 52.

While this invention has thus far been described in specific conjunction with only two preferred embodiments thereof and a few modifications, it will now be readily possible for one skilled in the art to carry this invention into effect in various other manners. For example, the input digital signal sequences may be three or more in number. The branched signal sequences may also be three or more in number. Some of the predetermined or the first predetermined number of input digital signal sequences may be empty signal sequences, namely, may not be used in actually carrying information which should be conveyed from the modulator device of the first modem device to the demodulator device of the second modem device.

What is claimed is:

1. A modem device comprising a modulator device and a demodulator device, said modulator device comprising a digital-to-analog converter circuit for converting a predetermined number of input digital signal sequences into a plurality of multivalued baseband signal sequences, respectively, a modulator circuit for quadrature amplitude modulating a modulator carrier signal by said baseband signal sequences into a plurality of amplitude modulated signal sequences, respectively, a combining circuit for combining said amplitude modulated signal sequences into a quadrature amplitude modulated signal, and a first surface acoustic wave rolloff filter circuit having a first passband delay characteristic for band-limiting said quadrature amplitude modulated signal into a modulator output signal, said demodulator device comprising a second surface acoustic wave rolloff filter circuit having a second passband delay characteristic for rolloff waveform shaping a demodulator input signal into a rolloff waveform shaped signal, a branching circuit for branching said rolloff waveform shaped signal into a predetermined number of branched signal sequences, a demodulator circuit for quadrature amplitude demodulating said branched signal sequences into a plurality of demodulated signal sequences, respectively, and an analog-to-digital converter circuit for converting said demodulated signal sequences into a plurality of output digital signal sequences, respectively, wherein said second passband delay characteristic is an inverse characteristic of said first passband delay characteristic.

2. A modem device as claimed in claim 1, said first and said second passband delay characteristics having first and second ripple amplitudes, wherein said first and said second ripple amplitudes have opposite polarities.

3. A modem device as claimed in claim 2, wherein said second ripple amplitude is substantially equal to said first ripple amplitude.

4. A modem device comprising a modulator device and a demodulator device, said modulator device comprising a digital-to-analog converter circuit for converting a predetermined number of input digital signal sequences into a plurality of multivalued baseband signal sequences, respectively, a modulator circuit for quadrature amplitude modulating a modulator carrier signal by said baseband signal sequences into a plurality of amplitude modulated signal sequences, respectively, a combining circuit for combining said amplitude modulated signal sequences into a quadrature amplitude modulated signal, a first surface acoustic wave rolloff filter circuit having a first passband delay characteristic for band-limiting said quadrature amplitude modulated signal into a filter output signal, and a second surface acoustic wave rolloff filter circuit having a second passband delay characteristic for rolloff waveform shaping said filter output signal into a modulator output signal, said demodulator device comprising a branching circuit for branching a demodulator input signal into a predetermined number of branched signal sequences, a demodulator circuit for quadrature amplitude demodulating said branched signal sequences into a plurality of demodulated signal sequences, respectively, and an analog-to-digital converter circuit for converting said demodulated signal sequences into a plurality of output digital signal sequences, respectively, wherein said second passband delay characteristic is an inverse characteristic of said first passband delay characteristic.

5. A modem device as claimed in claim 4, said first and said second passband delay characteristics having first and second ripple amplitudes, wherein said first and said second ripple amplitudes have opposite polarities.

6. A modem device as claimed in claim 5, wherein said second ripple amplitude is substantially equal to said first ripple amplitude.

7. A modem device comprising a modulator device and a demodulator device, said modulator device comprising a digital-to-analog converter circuit for converting a predetermined number of input digital signal sequences into a plurality of multivalued baseband signal sequences, respectively, a modulator circuit for quadrature amplitude modulating a modulator carrier signal by said baseband signal sequences into a plurality of amplitude modulated signal sequences, respectively, and a combining circuit for combining said amplitude modulated signal sequences into a modulator output signal, said demodulator device comprising a first surface acoustic wave rolloff filter circuit having a first passband delay characteristic for band-limiting a demodulator input signal into a filter output signal, a second surface acoustic wave rolloff filter circuit having a second passband delay characteristic for rolloff waveform shaping said filter output signal into a rolloff waveform shaped signal, a branching circuit for branching said rolloff waveform shaped signal into a predetermined number of branched signal sequences, a demodulator circuit for quadrature amplitude demodulating said branched signal sequences into a plurality of demodulated signal sequences, respectively, and an analog-to-digital converter circuit for converting said demodulated signal sequences into a plurality of output digital signal sequences, respectively, wherein said second passband delay characteristic is an inverse characteristic of said first passband delay characteristic.

8. A modem device as claimed in claim 7, said first and said second passband delay characteristic having first and second ripple amplitudes, wherein said first and said second ripple amplitudes have opposite polarities.

9. A modem device as claimed in claim 8, wherein said second ripple amplitude is substantially equal to said first ripple amplitude.

10. A combination of first and second surface acoustic wave rolloff filter circuits which have first and second passband delay characteristics and are for use between a modulator device and a demodulator device, said modulator device comprising a digital-to-analog converter circuit for converting a predetermined number of input digital signal sequences into a plurality of multivalued baseband signal sequences, respectively, a modulator circuit for quadrature amplitude modulating a modulator carrier signal by said baseband signal sequences into a plurality of amplitude modulated signal sequences, respectively, and a combining circuit for combining said amplitude modulated signal sequences into a quadrature amplitude modulated signal, said demodulator device comprising a branching circuit for branching a branching circuit input signal into a plurality of branched signal sequences, a demodulator circuit for quadrature amplitude demodulating said branched signal sequences into a plurality of demodulated signal sequences, respectively, and an analog-to-digital converter circuit for converting said demodulated signal sequences into a plurality of output digital signal sequences, respectively, said first surface acoustic wave rolloff filter circuit being for band-limiting into a filter output signal the quadrature amplitude modulated signal supplied from said combining circuit, said second surface acoustic wave rolloff filter circuit being for rolloff waveform shaping said filter output signal into a rolloff waveform shaped signal for supply to said branching circuit as said branching circuit input signal, wherein said second passband delay characteristic is an inverse characteristic of said first passband delay characteristic.

11. A combination as claimed in claim 10, said first and said second passband delay characteristics having first and second ripple amplitudes, wherein said first and said second ripple amplitudes have opposite polarities.

12. A combination as claimed in claim 11, wherein said second ripple amplitude is substantially equal to said first ripple amplitude.

* * * * *